March 15, 1927. 1,621,297
F. B. WALDRON
PROCESS OF POLISHING GLASS AND APPARATUS THEREFOR
Original Filed Nov. 11, 1924
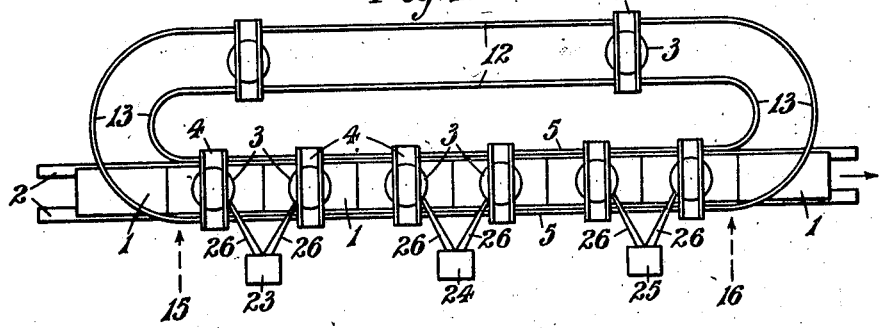
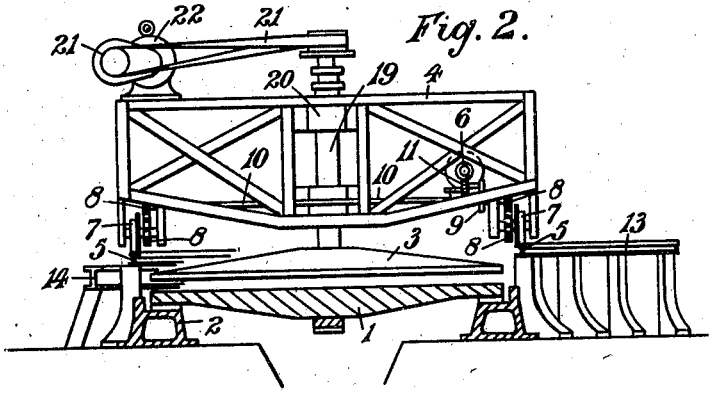
Inventor.
By F. B. Waldron
Rogers, Kennedy Campbell
Attys Patented Mar. 15, 1927.

1,621,297

UNITED STATES PATENT OFFICE.

FREDERIC BARNES WALDRON, OF PRESCOT, ENGLAND, ASSIGNOR TO PILKINGTON BROTHERS LIMITED, OF LIVERPOOL, ENGLAND, A COMPANY OF ENGLAND.

PROCESS OF POLISHING GLASS AND APPARATUS THEREFOR.

Original application filed November 11, 1924, Serial No. 749,136, and in Great Britain November 23, 1923. Divided and this application filed June 10, 1926. Serial No. 115,118.

This invention relates to continuous grinding and polishing of a series of plates of glass and apparatus therefor, and has for its object improved methods and apparatus whereby the polishing is done in a shorter time and with less expenditure of power than has heretofore obtained with other methods.

In the following specification and claims, the term "continuous polishing" as applied to methods or apparatus is used to mean the polishing of a strip of glass or a series of plates of glass forming a practically continuous strip which is moved in the direction of its length, and is subjected to the action of polishing runners during its motion.

The term "runner" when not specifically characterized is used to mean a polishing runner of any known type adapted to the work, whether rotary or reciprocating or both. The term "stationary" when applied to a runner is used to mean stationary in respect to travel only.

In the continuous polishing apparatus as heretofore employed, the strip of glass is passed slowly under a series of stationary runners. Each runner therefore is always performing the same work with the same abrasive or polishing medium on glass which is in the same stage of the polishing operation.

Now it is found that polishing is best effected when each runner passes through a series of stages in which the treatment and consequently the condition of its polishing surfaces, differ. Customarily there are three such stages, one in which the rouge is washed out of the surfaces by a plentiful supply of water, a second in which rouge and water are supplied to the polishing surfaces, and a third in which water only is supplied while the rouge impregnating the surface, effects the polishing, sufficient water only being supplied as a lubricant. To effect good and rapid polishing, each runner must pass successively through these three stages and each section of glass must be operated on successively by polishing runners having their surfaces in the condition of these three stages.

According to this invention, the runners as well as the strip of glass are caused to travel continuously and each runner operates in succession over one and the same length of strip, with its polishing surfaces in the different conditions which are produced by the different treatments.

In the accompanying drawings:—

Figure 1 is a diagrammatic plan view (partly broken away) of a continuous polishing apparatus according to the present invention;

Figure 2 is a transverse section of the glass-carrying tables on their guides, showing a runner frame in elevation and Figures 3 and 4 are diagrams indicating a polishing operation.

The series of glass-carrying tables 1 are moved on their guides 2 in the direction of the arrow in Figure 1, in the customary manner, the means for removing tables from, and adding them to, the series, not being shown. Polishing runners 3 mounted in frames 4 are adapted to travel along the line of the tables 1, on rails 5. Each runner frame 4 may be caused to travel by any convenient means, such as a motor 6 driving the frame-supporting wheels 7 through gears 8, differential gear, in a case 9, on shaft 10, and worm wheel 11.

Each runner frame 4 is caused to travel from the position shown at 15 in Figure 1, to the position 16 and is then removed to a return track 12, by means of which it is brought back to its initial position over the tables. The frame 4 may be transferred from the operative track 5 to the return track 12 by any convenient means such as that shown, in which the track 5 is connected at each end to the track 12 by curved tracks 13, the outer rails being supported in their passage over the tables, on girders 14 (Figure 2).

Each runner is mounted on a vertical shaft 19 adapted to be turned in bearings 20 through a belt and gear drive 21 by a motor 22 mounted on a frame 4. Any other form of runner may, however, be employed, such as a plurality of rotating discs mounted on a frame, or reciprocating blocks.

It is to be understood that a plurality of polishing runners 3 operate simultaneously on the length of glass and they may be so close together that practically the whole surface of the glass along the length is operated on simultaneously, or they may be close together in sets, with intervals between the sets for washing. For the purpose of the following description however, it is assumed that runners such as are shown in the drawings are employed, each runner being separated from the next by a certain space.

Apparatus for the supply of polishing media to the runners are located at intervals along the apparatus, as at 23, 24, 25, and the media are supplied to the runners 3 by conduits 26. Each apparatus supplies the same medium to the runners operating over a certain length of the apparatus in its neighbourhood. For instance, apparatus 23 may supply water in considerable quantity, 24 rouge and water, and 25 water in small quantity.

According to this invention the runners all travel at a constant speed, which, for the purpose of this description will be assumed to be half the speed of the glass. Further, it will be assumed that each runner is to be subjected to three different kinds of treatment, denoted by treatments 1, 2 and 3 and that, while subjected to these treatments, it is to start operating on the glass in three different stages of the process, denoted by stages 1, 2 and 3 respectively, the stage after completion of the third being denoted by 4.

Referring to Figures 3 and 4, X, Y, (Figure 3) represents a length of glass which, in a given time, travels to $X^1$, $Y^1$, (Figure 4). On the length X, Y, are six runners, a, b, c, d, e and f, at equal distances apart, namely half the distance moved by the length X, Y, in travelling to $X^1$, $Y^1$. These runners are shown in Figure 3 as occupying positions relative to the ground indicated by A, B, C, D, E, F, respectively. In the given time, each runner moves into the position previously occupied by the preceding runner, that is to say, into positions B, C, D and so on. If, in Figure 3, the several divisions of the length of glass be in the stages of the process indicated by the Figures 1, 2, 3 connected therewith, and further indicated by the superimposed horizontal lines, and if the several runners are to be subjected to the treatments denoted by the Figures 1, 2, 3 connected therewith, the result of the operation of the runners on the length X, Y, in its travel to $X^1$, $Y^1$, is as indicated by the Figures 1, 2, 3 connected with the divisions of the length of glass and with the runners in Figure 4. The runner f, having reached position G and completed its operation with treatment 3 is removed from the operative track, while a runner g comes into position. It will be seen that each runner operates successively with treatments 1, 2 and 3 during its operation on each pair of divisions in which the glass is in stages 1, 2 and 3 respectively.

In the above description, three treatments and a ratio of speeds of glass and runners of 2 to 1, have been taken only by way of example, and any desired number of treatments may be given and any ratio of speeds, integral or fractional and any number of runners may operate simultaneously with the same treatment. It is, however, to be observed that with certain ratios of speed and numbers of runners, the point at which the final operation is completed, varies in position, but may be made to retain a fixed average position.

Having described my invention, I declare that what I claim and desire to secure by Letters Patent is:—

1. In the process of continuous polishing of glass, moving the runners in the direction of motion of the glass at a constant speed different from that of the glass and treating their polishing surfaces successively with different treatments at different stages of travel of a runner.

2. In the process of continuous polishing of glass, moving the runners in the direction of motion of the glass at a constant speed different from that of the glass, treating their polishing surfaces successively with different treatments at different stages of travel of a runner, removing the runner from its operative position after the completion of its operative course and transporting it by means which are clear of the succeeding runners to the start of its operative course.

In testimony whereof I have affixed my signature hereto.

FREDERIC BARNES WALDRON.